(12) United States Patent  (10) Patent No.: US 7,026,923 B2
Martin  (45) Date of Patent: Apr. 11, 2006

(54) VEHICLE SIGNALIZATION RETROFIT KIT

(76) Inventor: Armand Martin, 637 East Green River Road P.O. Box 568, Green River, New Brunswick (CA) E7C 2M6

( * ) Notice: Subject to any disclaimer, the term of this patent is extended or adjusted under 35 U.S.C. 154(b) by 162 days.

(21) Appl. No.: 10/834,942

(22) Filed: Apr. 30, 2004

(65) Prior Publication Data

US 2005/0242940 A1    Nov. 3, 2005

(51) Int. Cl.
*B60Q 1/50* (2006.01)

(52) U.S. Cl. .............. 340/464; 340/479; 340/467; 307/10.1

(58) Field of Classification Search ............ 340/479
See application file for complete search history.

(56) References Cited

U.S. PATENT DOCUMENTS

| | | | |
|---|---|---|---|
| 2,096,069 A | 10/1937 | Seiden | |
| 2,128,769 A | 8/1938 | Finnell | |
| 2,250,133 A | 7/1941 | Pearce et al. | |
| 2,463,088 A | 3/1949 | Coombs | |
| 2,513,712 A | 7/1950 | Coombs | |
| RE23,719 E | 10/1953 | Coombs | |
| 3,109,158 A | 10/1963 | Coombs | |
| 3,115,559 A | 12/1963 | Cass et al. | |
| 3,395,388 A | 7/1968 | Hendrickson | |
| 3,497,871 A | 2/1970 | Damico | |
| 3,760,353 A * | 9/1973 | Hassinger | 340/467 |
| 3,821,701 A * | 6/1974 | Ross | 340/464 |
| 4,491,824 A | 1/1985 | Chiou | |
| 4,751,493 A * | 6/1988 | Miller | 340/467 |
| 4,891,625 A | 1/1990 | VanRiper et al. | |
| 4,933,666 A | 6/1990 | Maple | |
| 4,970,493 A * | 11/1990 | Yim | 340/468 |
| 5,164,701 A | 11/1992 | Nan-Mu et al. | |
| 5,381,135 A * | 1/1995 | Blount | 340/487 |
| 5,663,707 A | 9/1997 | Bartilucci | |
| 6,034,599 A * | 3/2000 | Beacom | 340/475 |
| 2002/0171543 A1 | 11/2002 | Abbe et al. | |
| 2003/0234724 A1 | 12/2003 | Chiu | |

FOREIGN PATENT DOCUMENTS

| | | |
|---|---|---|
| CA | 2007060 | 7/1991 |
| CA | 2015418 | 10/1991 |

* cited by examiner

*Primary Examiner*—Jeffery Hofsass
*Assistant Examiner*—George Bugg
(74) *Attorney, Agent, or Firm*—Mario Theriault

(57) ABSTRACT

The vehicle signalization retrofit kit according to the present invention comprises a limit switch assembly wherein a pair of limit switches are pre-wired with a colour coded wiring system and connectors, and are adjustably affixed to a post that is easily mountable by bonding to the firewall of a vehicle, between the brake pedal and the accelerator pedal. The wiring system has a connection to the battery of the vehicle such that no interference with the wiring system or the fuse box of the vehicle is required. The retrofit kit also has a pair of light modules each having colored lights of red, amber and green colours. One light module is mountable to the front end of the vehicle and the other is mountable to the rear end of the vehicle for communicating to nearby drivers and pedestrians various operating conditions of the vehicle, such as braking, decelerating and accelerating.

20 Claims, 4 Drawing Sheets

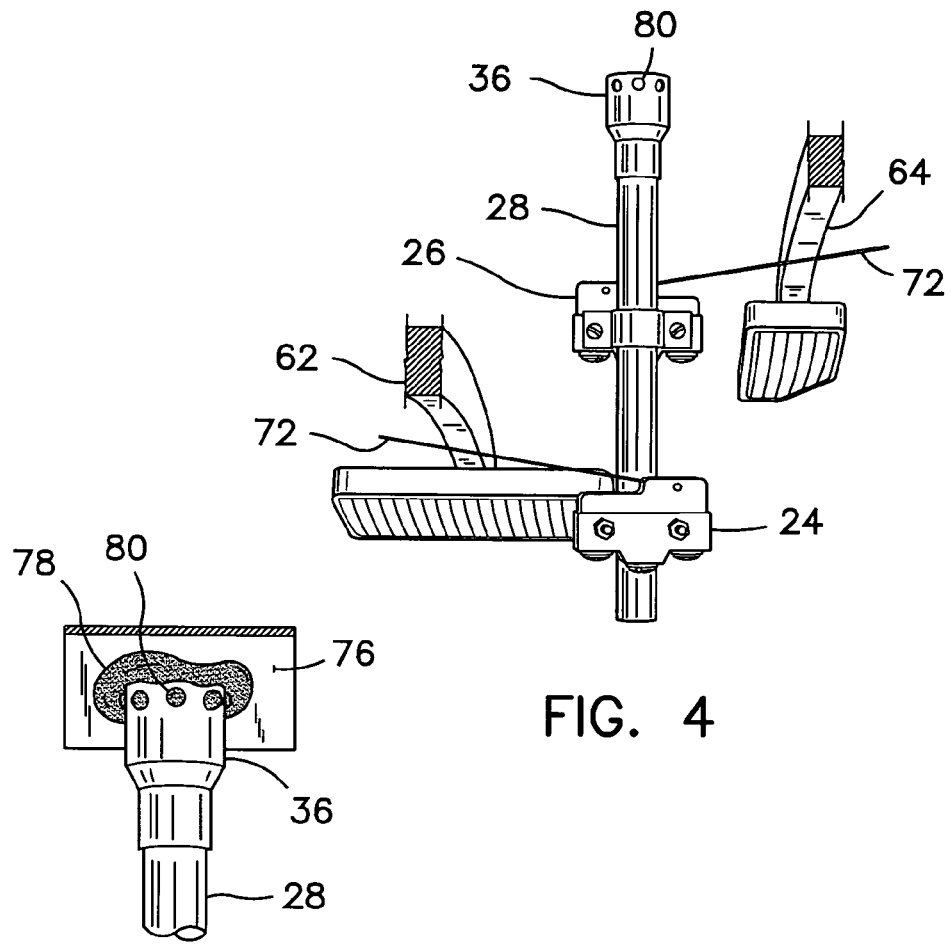
FIG. 4
FIG. 6
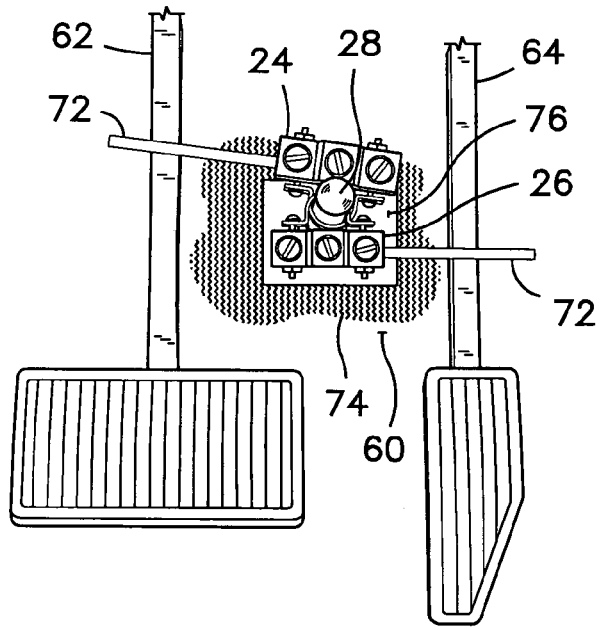
FIG. 5

VEHICLE SIGNALIZATION RETROFIT KIT

FIELD OF THE INVENTION

This invention pertains to vehicle signalization accessories, and more particularly it pertains to an after market vehicle signalization system in the form of an universal retrofit kit.

BACKGROUND OF THE INVENTION

Conventional signalization for vehicles is generally limited to the brake lights at the rear end of a vehicle and the turn signal lights at both the front end and the rear end of the vehicle. It has been stated by numerous inventors in the past, that it would be safer to operate a motor vehicle if a driver could better predict the intentions of other drivers in nearby vehicles. Numerous proposals were made in that regard to add signalization on the outside of a vehicle in order to reduce the number of accidents involving motor vehicles.

Prior inventors have proposed in the 1960's or before, as a safety feature, an additional brake light in a highly visible location on the rear end of a vehicle, well above the regular brake lights. This courtesy brake light became standard on all automobiles and pickup trucks since the 1970's, and is now considered essential to safe driving. Similarly, prior inventors have proposed in the 1930's or before, a signalization system including an amber light to signal a deceleration by compression of the engine, a green light to signal an acceleration or a steady speed, and of course, a red light in the front as well as in the back of the vehicle to indicate a braking condition. However, these additional light circuits require the installation of switches to detect the movements of the arms of the brake and the accelerator pedals, additional light modules to be affixed to the outside of the vehicle and additional wiring. The cost of these accessories would have been passed on the purchaser of the vehicle or taken out from the manufacturer's profit. It is believed that it is for that reason, basically, that only the brake light in the back, and the turn signal lights were considered essential and were kept in the standard design. Consequently, the amber and the green light proposals never enjoyed a commercial success.

Examples of the signalization systems proposed by prior inventors are listed below:

U.S. Pat. No. 2,096,069 issued to E. J. Seiden on Oct. 19, 1937;
U.S. Pat. No. 2,128,769 issued to L. O. Finnell on Aug. 30, 1938;
U.S. Pat. No. 2,250,133 issued to E. S. Pearce et al. on Jul. 22, 1941.
U.S. Pat. No. 2,463,088 issued to R. S. Coombs on Mar. 1, 1949;
U.S. Pat. No. 2,513,712 issued to R. S. Coombs on Jul. 4, 1950;
U.S. Pat. No. RE. 23,719 issued to R. S. Coombs on Oct. 6, 1953;
U.S. Pat. No. 3,109,158 issued to R. S. Coombs on Oct. 29, 1963;
U.S. Pat. No. 3,115,559 issued to L. G. Cass et al. on Dec. 24, 1963;
U.S. Pat. No 3,395,388 issued to J. R. Hendrickson on Jul. 30, 1968;
U.S. Pat. No 3,497,871 issued to A. S. Damico on Feb. 24, 1970;
U.S. Pat. No 4,491,824 issued to N. M. Chiou on Jan. 1, 1985;
U.S. Pat. No 4,933,666 issued to H. G. Maple on Jun. 12, 1990;
U.S. Pat. No. 4,891,625 issued to B. C. VanRiper et al. on Jan. 2, 1990;
U.S. Pat. No. 5,164,701 issued to C. Nan-Mu et al. on Nov. 17, 1992;
U.S. Pat. No 5,663,707 issued to G. M. Bartilucci on Sep. 2, 1997;
U.S. Publ. US2002/0171543 of D. C. Abbe et al. dated Nov. 21, 2002;
U.S. Publ. US2003/0234724 of C. P. Chiu dated Dec. 25, 2003;
CA Appl. 2,007,060 of R. Dugas et al. published on Jul. 03, 1991;
CA Appl. 2,015,418 of N. M. Chiou, published on Oct. 25, 1991.

Although the devices and apparatus of the prior art deserve undeniable merits, is believed that these prior art systems can only be installed at the factory during the construction of the vehicle, or in the dealers' garages by technicians specialized in the electrical systems of motor vehicles. It is believed that the installation of any of the signalization systems of the prior art would have been relatively costly, and therefore, these systems did not appeal to a majority of vehicle owners.

Therefore, it is believed that a market demand still exists for better signalization on the outside of a motor vehicle, and especially for a better and easier method of installing the additional signalization without having to tap into the existing wiring system of the vehicle or to attach switches to hard-to-reach places under the dashboard of the vehicle.

SUMMARY OF THE INVENTION

The vehicle signalization system according to the present invention, comprises a limit switch assembly wherein the limit switches are pre-wired with a colour coded wiring system and connectors, and are adjustably affixed to a post that is easily mountable by bonding to the firewall of the vehicle, between the brake pedal and the accelerator pedal. The wiring system has a connection to the battery of the vehicle such that no interference with the wiring system or the fuse box of the vehicle is required. The vehicle signalization retrofit kit according to the present invention is mountable in various makes and models of vehicles without drilling, tapping, or modifying in any way the structure or the electrical system of the vehicle.

In a broad aspect of the present invention, there is provided a vehicle signalization retrofit kit, comprising a pair of light modules each having coloured lights of red, amber and green colours. A colour-coded wiring system is provided for supplying power directly from the battery of the vehicle to the light modules. The colour codes on the wiring correspond to the colours of the coloured lights. A first and second limit switches are also provided and are connected to the wiring system for controlling the lighting up of the coloured lights according to various conditions of the switches. There is also provided a switch post to which the limit switches are adjustably mounted. This switch post has a base that is attachable by bonding to the firewall of a vehicle.

This vehicle signalization retrofit kit is by its configuration easily installed in a vehicle without special tools or special knowledge of the electrical system of that vehicle.

In another aspect of the present invention, the wiring system and the limit switches are connected in such a way as to energize only the red lights, only the amber lights, or only the green lights at the same time. The limit switches and the wiring system are also connected in such a way that the amber and green lights are positively de-energized when the red lights are lit up such that the red lights have priority over the other ones.

In yet another aspect of the present invention, the wiring system comprises several series of single-wire connectors, such that portions of the wiring system can be threaded, one connector at the time, through relatively small openings out of the passenger compartment of a vehicle.

In yet another aspect of the present invention, each light module has mounting tabs hinged to the housing thereof for easy mounting of the light module to various portions of a vehicle. Furthermore, the housing of each light module is made of a malleable material so that it can be shaped to accommodate the curvature of the portion of the vehicle on which it is mounted. It is believed that the light modules included in the retrofit kit according to the present invention do not lessen the visual appeal of any modem vehicle on which they are mounted.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

One embodiment of the present invention is illustrated in the accompanying drawings, in which like numerals denote like parts throughout the several views, and in which:

FIG. 4 is a top view of the switch post in an installed position;

FIG. 5 is rear view of the switch post in an installed position;

FIG. 6 is an enlarged top view of the base of the switch post and of its mounting to the firewall of a vehicle;

DESCRIPTION OF THE PREFERRED EMBODIMENT

Figure 1:
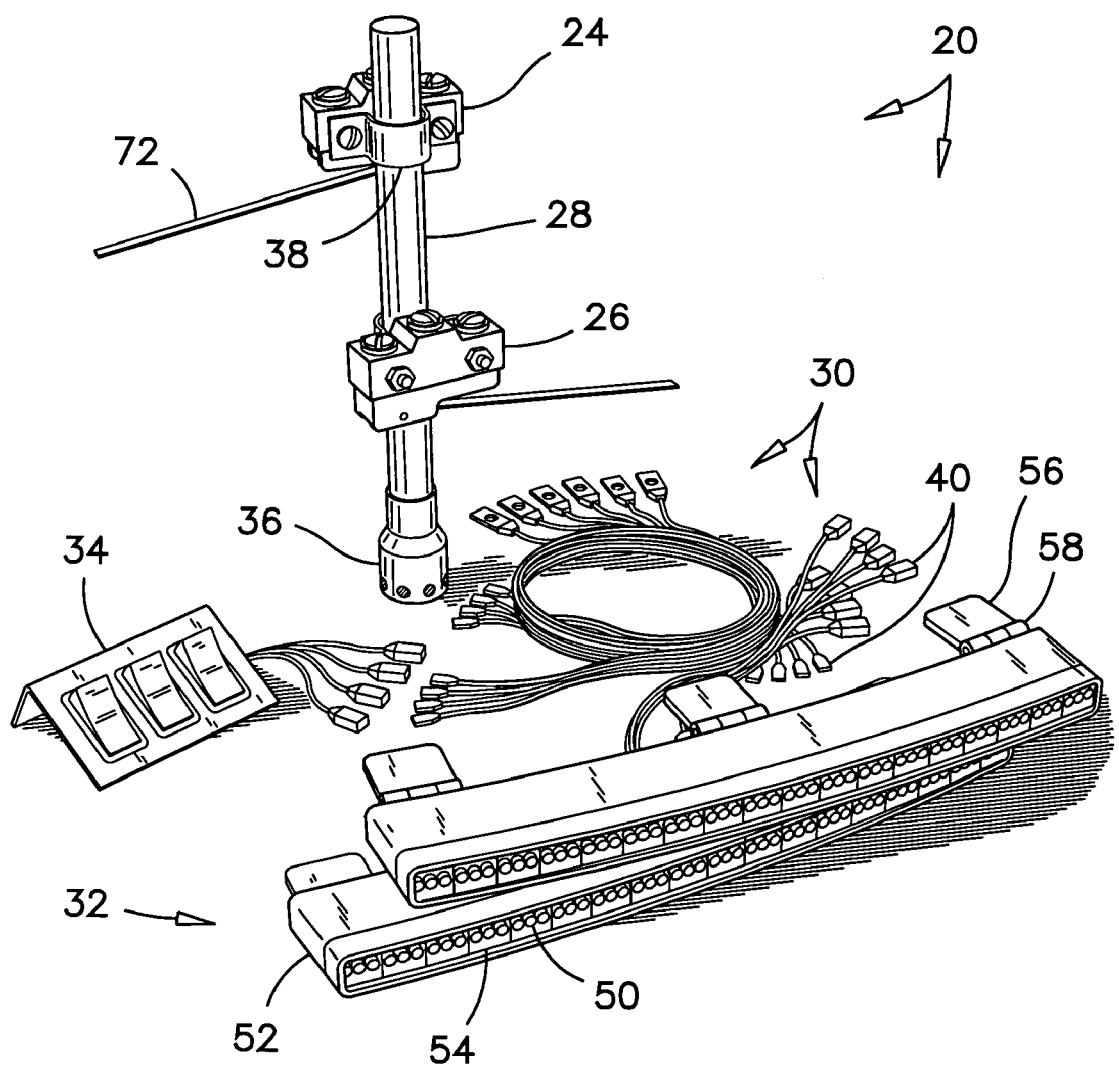
FIG. 1 is a perspective view of the vehicle signalization retrofit kit according to the preferred embodiment of the present invention.

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described.

Referring firstly to FIG. 1, the basic components of the preferred universal retrofit kit 20 are illustrated therein. The preferred retrofit kit comprises a pair of limit switches 24, 26 mounted to a switch post 28. A wiring system is provided and is generally labelled as 30. A pair of light modules 32 are provided for attachment to the front end and to the rear end of a vehicle. Illuminated monitoring switches 34 are optional. These switches 34 are optionally provided for mounting inside the vehicle for monitoring the operation of the light modules 32.

The switch post 28 has an enlarged base 36 for bonding to the firewall of a vehicle, as it will be explained later. The limit switches 24, 26 are mounted to the switch post 28 by means of tube clamps 38. The clamps 38 are mounted to the switch post 28 with a sliding fit tolerance or tension, such that the limit switches 24, 26 can be adjusted along and around the switch post 28 by a force of approximately 5 lbs.

The wiring system 30 comprises several series of single-wire connectors 40 such that portions of this wiring system can be threaded, one connector at the time, into a relatively small hole through the firewall of the vehicle, or alongside existing conduits or cables extending outside the passenger compartment of the vehicle.

Each light module 32 is made of coloured light emitting diodes (LEDs) 50 mounted side by side in a sealed housing 52. These diodes 50 are arranged in sets of three, aligned behind a clear lens 54. Each set of diodes 50, contains a red diode, an amber diode and a green diode. For convenience, the word diodes and lights are used interchangeably herein to refer to the light emitting diodes 50.

It will be understood from the following description, that the red light indicates a braking condition, the amber light indicates a coasting condition, where the operator of the vehicle does not apply pressure on neither the brake pedal nor the accelerator pedal, and the green light indicates an accelerating or constant speed condition, where the accelerator pedal is depressed at least a small amount.

There are also provided on the housing 52 of each light module 32, a series of tabs 56 affixed to the housing 52 by means of respective hinges 58. Each tab 56 preferably has on its surface, an adhesive tape, a mounting hole, or other means of attachment of the tab to a vehicle. The hinges 58 are adjustable to mount each light module 32 to any of several preferred locations on a vehicle. The hinges 58 have a tight fit tolerance in their moving parts so as to retain an initial adjustment thereof on a vehicle under normal driving conditions.

The housing 52 of each light module preferably has a length of about 6–10 inches, a thickness of about ⅜ to ¾ inch, and a depth of ¾ to 1½ inches. It preferably has a sleek design and a moderate bow shape with the ends pointing toward the rear side thereof, as illustrated in FIG. 1. Each housing 52 is preferably made of a plastic material that is somewhat malleable and that has shape-retention memory, such that it can be bent to some degrees lengthwise and crosswise to match various curvatures on the vehicle on which it is mounted.

Figure 2:
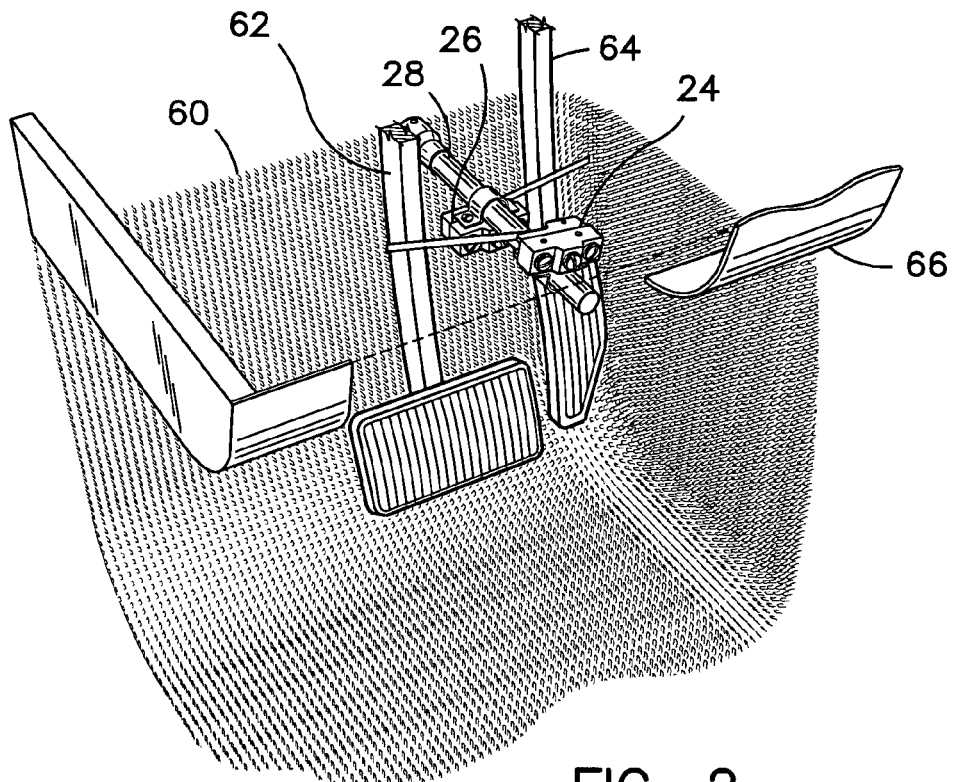
FIG. 2 is a perspective cutaway view through the dashboard of a vehicle showing the mounting of the switch post of the preferred vehicle signalization retrofit kit to the firewall of the vehicle.
Figure 3:
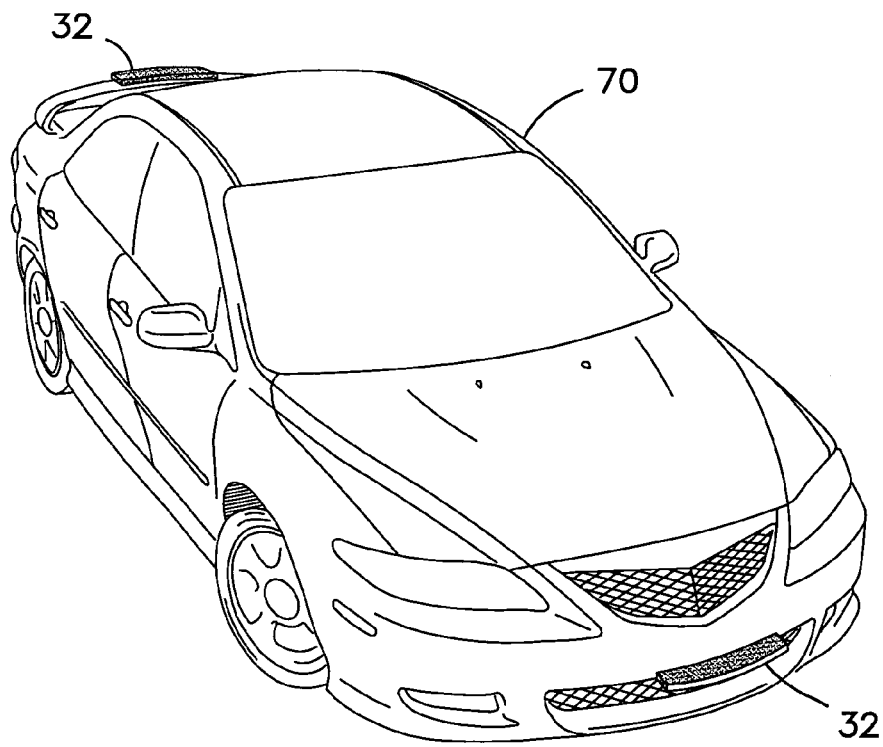
FIG. 3 is a perspective front and top view of a vehicle having a pair of the signalization light modules as described herein, mounted thereto.

Referring now to FIGS. 2 and 3, the switch post 28 is preferably affixed to the firewall 60 of a vehicle, between the brake pedal 62 and the accelerator pedal 64, under or immediately below the dashboard 66 of the vehicle.

One of the light modules 32 is preferably mounted at any convenient location on the front end of a vehicle 70 such that it can be easily seen by approaching traffic and pedestrians. The other light module 32 is preferably affixed to another highly visible location on the rear end of the vehicle. One advantage of having the signalling light module 32 on the front end of a vehicle is that it indicates to pedestrians at an intersection for example, the running condition of an approaching vehicle. These pedestrians can readily detect the intentions of the driver in that vehicle, and decide whether or not they should walk in the front of it. One advantage of the rear light module 32 is to provide a driver in a following vehicle with the ability to predict a deceleration by compression of the engine, and an eventual braking of the vehicle ahead of him.

Referring now to FIGS. 4, 5 and 6, the mounting of the limit switches 24, 26 and of the switch post 28 will be explained in greater details. The limit switches are of the type having a normally open contact, a normally closed contact and a respective wand 72 extending at least about 3½ to 4 inches from the axis of the switch post 28. One example of such limit switches is a Model Z, General Purpose Basic Switch, available from Omron™ Canada Inc. a Company having its head offices in Scarborough, Ontario, Canada.

The switch post 28 with the limit switches 24, 26 mounted thereto is held between the brake pedal and the accelerator pedal of the vehicle at a location that is high enough so not to interfere with the foot movement of the driver, and where the wands 72 of the limit switches 24, 26 are respectively in contact with the arm 62 of the brake pedal and with arm 64 of the accelerator pedal. The location of the base 36 of the switch post 28 is then marked on the firewall 60 of the vehicle.

Then, the carpet 74 of the firewall 60 is cut out and the metal of the firewall 60 is exposed over an area 76 corresponding to the location of the base 36 of the switch post. Using a resinous bonding compound 78, often referred to as plastic metal or plumber putty, the base 36 of the switch post is bonded to the bare metal of the firewall 76. A typical shear strength of the preferred bonding compound is 3,000 psi. An example of such a bonding compound 78 is marketed under the name Cold Weld™, by Permatex™, Inc., a company having its head offices in Solon, Ohio, USA. A sufficient amount of an appropriate bonding compound 78 is preferably included in the preferred vehicle signalling retrofit kit, such that it is readily available to the purchaser of the preferred retrofit kit.

In order to ensure a strong bond between the base 36 of the switch post and the firewall, the base 36 has a hollow shape and several radial holes 80 near the rim of the base. A sufficient amount of bonding compound 78 should be used to partly fill the hollow shape of the base 36 and to flow out through these holes 80. The switch post 28 is then held in place for a few minutes until the bonding compound starts to take hold.

A preferred material of construction for the switch post 28 is a nominal ½ inch copper tubing and the preferred material of construction for the base 36 is a tubing reducer coupling having a nominal size of ½ inch to ¾ inch. It will be appreciated that the switch post 28, and the base 36 can be manufactured from materials other than copper, depending upon the preference of the manufacturer.

When the bonding compound has set or hardened to hold the switch post 28 in place, such as after a period of 15–30 minutes or so, the limit switches 24, 26 can be adjusted to their final positions. The adjustment of both switches is done by moving them along the switch post 28 until their wands 72 touch the arms 62, 64 of the brake and accelerator pedals respectively, and the normally open contact in each switch is closed. The switches are further moved slightly toward the arms 62, 64 of the pedals such that a pre-travel of approximately 1/16 to 1/8 of an inch is required in each pedal to change the state of the switches.

It will be appreciated that the stress on the switch post 28 is maximum at the initial position of the switches 24, 26 as described above. The force on the wands 72 of the switches is a fraction of one pound. Therefore, the force required to hold the limit switches in place along the switch post 28 and the overall stress on the switch post 28 is negligible as compared to the holding strength of the bonding compound specified above. The sturdiness of this installation is believe to be sufficient to last the life of the vehicle.

In order to further simplify the work required to install the preferred retrofit kit, the wiring of the switches 24, 26 is preferably done before bonding the switch post in place and adjusting the position of the switches. In fact, the connection of the wiring system 30 to the limit switches 24, 26 is preferably effected at the factory before the packaging of the retrofit kit and its distribution to retail outlets. These connections have been omitted in FIGS. 1, 2, 4 and 5 to maintain the clarity of these drawings.

Figure 7:
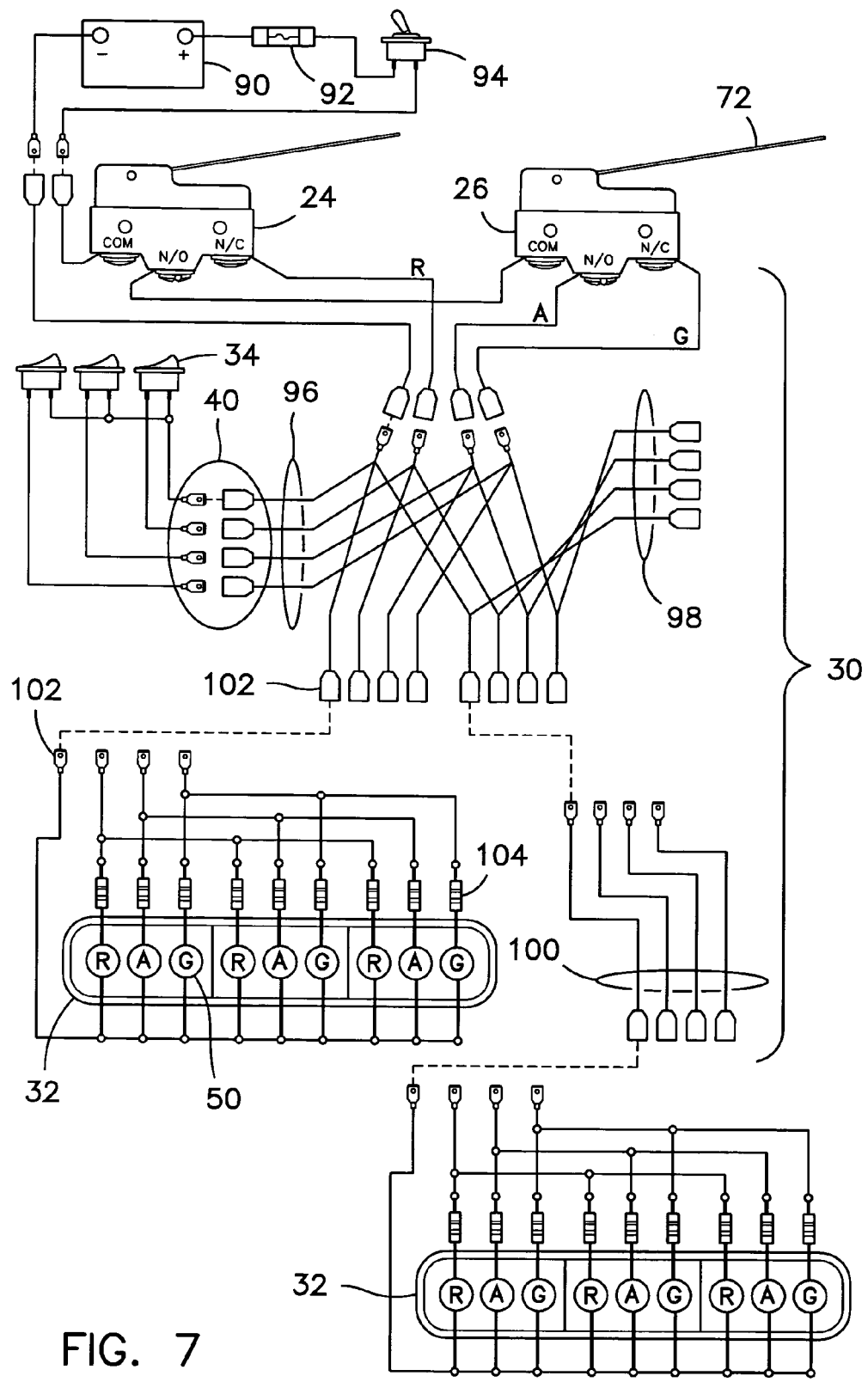
FIG. 7 is schematic diagram of the wiring system in the vehicle signalization retrofit kit according to the preferred embodiment.

The wiring of the switches 24, 26 and of the light modules 32 is illustrated in FIG. 7. The wiring system 30 is preferably connected directly to the battery 90 of the vehicle. The wiring system 30 preferably comprises a fuse 92 and an on-off switch 94. The power is firstly supplied to the common terminal of the brake pedal switch 24. The initial pre-tensioning of the wand 72 of the brake pedal switch 24 as described before, closes the normally open contact of that switch 24 to transmit power to the common terminal of the accelerator pedal switch 26. When the wand 72 of the brake pedal switch 24 is released from its tensioned position, the power is cut off to the accelerator pedal switch 26 and is applied to the normally closed terminal of the brake pedal switch 24, thereby energizing the red diodes, labelled as "R" on the diagram of FIG. 7. It will be appreciated from the above description that the red diodes have precedence over the other lights.

During all non-braking conditions, power is available to the accelerator switch 26, to light up either the amber "A" or the green "G" diodes, of which the respective wiring is labelled by the same letters, or coded with the same colours.

When the accelerator pedal is at rest, the normally open contact of the accelerator pedal switch 26 is closed, thereby energizing the amber "A" diodes in the light modules 32. When the accelerator pedal is depressed, the green "G" diodes are lit up.

The wiring system 30 comprises several series of single-wire connectors 40 to facilitate the threading of the wiring through relatively small openings out of the passenger compartment of the vehicle. One series of connectors 96 is preferably provided for connection to the illuminated monitoring switches 34. Another series of connectors 98 is preferably provided for connection to a third light module mounted on a trailer towed behind the vehicle for example. One or more extensions 100 are provided for connection of the light modules 32 to the switches 24, 26. The connectors in each series 40 are preferably coloured or colour coded according to the colours of the diodes energized therefrom, with the ground connectors 102 left unmarked or coloured white.

The coloured diodes 50 in each light module 32 are typically 3 volt LEDs. Each diode 50 is connected to the wiring system in series with a 470 ohm resistor 104.

The vehicle signalization retrofit kit described above does not tap into the existing wiring system of an automobile and is easily adjusted to various configurations of brake pedals, accelerator pedals and various vehicle interiors.

Furthermore, the vehicle signalization retrofit kit according to the present invention operates equally well when the vehicle is travelling in a cruise controlled mode. In the cruise controlled mode, the accelerator pedal still moves as if it was operated by the foot of the driver. This movement is detected by the accelerator limit switch 26 to operate the light modules accordingly.

As to other manner of usage and operation of the retrofit kit of present invention, the same should be apparent from the above description and accompanying drawings, and accordingly further discussion relative to the manner of usage and operation of the invention would be considered repetitious and is not provided.

While one embodiment of the present invention has been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. A vehicle signalization retrofit kit, comprising;
   a first light module having coloured lights therein of a first, second and third colours;
   a wiring system having means for connection thereof to said first light module and to a power source;
   a first and second limit switches having means for connection to said wiring system;
   a switch post having means for attachment thereof to the firewall of a vehicle, and means for retaining said limit switches thereto, and
   said limit switches and said wiring system further comprising means for selectively lighting up said coloured lights of any one of said colours at a time.

2. The vehicle signalization retrofit kit as claimed in claim 1, further comprising means to give priority to said coloured lights of said first colour over said coloured lights of said second and third colours.

3. The vehicle signalization retrofit kit as claimed in claim 1, further comprising a second light module also having coloured lights of said first, second and third colours.

4. The vehicle signalization retrofit kit as claimed in claim 3, wherein said coloured lights in said first and second light modules are light emitting diodes.

5. The vehicle signalization retrofit kit as claimed in claim 4, further comprising a resistor connected to said wiring system in series with each of said light emitting diodes.

6. The vehicle signalization retrofit kit as claimed in claim 1, wherein said wiring system comprises colour-coded connectors.

7. The vehicle signalization retrofit kit as claimed in claim 1, wherein said first and second limit switches are held to said switch post by clamps having a sliding fit engagement with said switch post.

8. The vehicle signalization retrofit kit as claimed in claim 1, wherein said switch post is a piece of copper tubing and said means for attachment thereof to the firewall of a vehicle is a tubing coupling.

9. The vehicle signalization retrofit kit as claimed in claim 8, wherein said tubing coupling has radial holes on an extremity thereof.

10. The vehicle signalization retrofit kit as claimed in claim 9, further comprising an amount of bonding compound for attachment of said tubing coupling to the firewall of a vehicle.

11. The vehicle signalization retrofit kit as claimed in claim 1, further comprising a series of illuminated switches having means for connection thereof to said wiring system and means for monitoring an operation of said coloured lights.

12. The vehicle signalization retrofit kit as claimed in claim 1, wherein said wiring system has means for connection thereto of a second and third light modules.

13. The vehicle signalization retrofit kit as claimed in claim 1, wherein said light module comprises a housing and said housing has mounting tabs extending therefrom.

14. The vehicle signalization system as claimed in claim 13, wherein said light module further comprises hinges between said tabs and said housing.

15. The vehicle signalization system as claimed in claim 13, wherein said housing has a sleek design and a bow shape.

16. The vehicle signalization system as claimed in claim 15, wherein said housing is made of a malleable plastic.

17. A vehicle signalization retrofit kit, comprising;
   a pair of light modules having coloured lights of a first, second and third colours;
   a wiring system having means for connection thereof to said light modules and to a power source; said means for connection comprising single-wire connectors being colour coded according to said first, second and third colours;
   a first and second limit switches connected to said wiring system; and
   a switch post having means for attachment thereof to the firewall of a vehicle, said limit switches being mounted to said switch post and being adjustably movable along said switch post.

18. The vehicle signalization retrofit kit as claimed in claim 17, further comprising a bonding compound for mounting said switch post to said firewall of a vehicle.

19. A vehicle comprising;
   a first light module mounted at the front end thereof, and a second light module mounted at the rear end thereof, said first and second light modules having light-emitting diodes of a first, second and third colours therein;
   a brake pedal;
   an accelerator pedal near said brake pedal;
   a firewall behind said brake and accelerator pedals;
   a post extending from said firewall between said brake pedal and said accelerator pedal;
   a first limit switch mounted to said post and having a first actuator in contact with said brake pedal;
   a second limit switch mounted to said post and having a second actuator in contact with said accelerator pedal;
   a wiring system connected to a power source, to said first and second limit switches and to said first and second light modules for lighting up said light emitting diodes of different colours according to different conditions of said brake pedal and said accelerator pedal.

20. The vehicle as claimed in claim 19, wherein said limit switches and said wiring system comprises means to selectively energize only said light-emitting diodes of said first colour, means to selectively energize only said light-emitting diodes of said second colour, and means to selectively energize only said light-emitting diodes of said third colour.

* * * * *